(12) United States Patent
Obrecht

(10) Patent No.: US 6,605,671 B2
(45) Date of Patent: Aug. 12, 2003

(54) PROCESS FOR THE PRODUCTION OF CROSS-LINKED RUBBER PARTICLES

(75) Inventor: Werner Obrecht, Moers (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/907,233

(22) Filed: Jul. 17, 2001

(65) Prior Publication Data

US 2002/0077414 A1 Jun. 20, 2002

(30) Foreign Application Priority Data

Jul. 21, 2000 (DE) .......................... 100 35 493

(51) Int. Cl.$^7$ ................ C08L 7/00; C08L 9/00
(52) U.S. Cl. ............. 525/194; 525/236; 525/237; 525/263
(58) Field of Search .............. 525/194, 236, 525/237, 263

(56) References Cited

U.S. PATENT DOCUMENTS

| | | | |
|---|---|---|---|
| 4,663,411 A | * | 5/1987 | Reeb et al. .......... 526/270 |
| 5,039,737 A | * | 8/1991 | Parker et al. ........ 524/804 |
| 5,395,891 A | | 3/1995 | Obrecht et al. ...... 525/194 |
| 6,127,488 A | | 10/2000 | Obrecht et al. ...... 525/333.3 |

FOREIGN PATENT DOCUMENTS

| | | |
|---|---|---|
| EP | 1 020 492 | 7/2000 |
| GB | 867916 | 5/1961 |
| GB | 880739 | 10/1961 |

OTHER PUBLICATIONS

Methoden Der Organischen Chemie, 4$^{th}$ edition, p. 848, (month unavailable) 1963, P. Schneider: Umwandlung von Naturkautschuk.

* cited by examiner

Primary Examiner—James J. Seidleck
Assistant Examiner—Olga Asinovsky
(74) Attorney, Agent, or Firm—Joseph C. Gil; Jennifer R. Seng; Noland J. Cheung

(57) ABSTRACT

The invention discloses an improved process for the production of cross-linked rubber particles. The cross-linking agents are added to the aqueous rubber dispersions and converted at relatively high temperatures without inertization of the reaction mix and without pressurizing of an inert gas.

The cross-linked rubber particles are suitable, for example, for the production of technical rubber products and for various tire components.

4 Claims, No Drawings

PROCESS FOR THE PRODUCTION OF CROSS-LINKED RUBBER PARTICLES

The invention discloses an improved process for production of cross-linked rubber particles, which are suitable for the partial or complete substitution of conventional fillers, such as carbon black or silicic acid, in rubber vulcanisates.

The use of rubber gels in vulcanisates is described, for example, in U.S. Pat. No. 5,395,891 (BR-gels) or in EP-A 854 170 (SBR-gels).

The normal procedure for producing cross-linked rubber particles (also known as rubber gels or micro-gels or gels), consists in the conversion of polymer dispersions (polymer dispersed in water) especially the conversion of rubber dispersions (rubber latices), with a peroxide, whereby the peroxide is added to the rubber latex and converted at a relatively high temperature corresponding to its half life. In this context, the dispersed rubber is cross-linked. To avoid subsidiary reactions of the peroxide with oxygen, the conversion is implemented either under an inert-gas atmosphere or the reaction mix is inertised by repeated cycles of pressurisation and depressurisation with inert gas.

In U.S. Pat. No. 5,395,891, Examples: BR gel A1, after addition of dicumyl peroxide, the autoclave is pressurised with 8 bar nitrogen pressure. The reaction is carried out at 150° C. Under these conditions, the pressure rises to 15.0 bar. Accordingly, a reactor must be selected which is capable of withstanding this pressure.

In EP-A 0 854 170, Examples 2, 3 and 4, after addition of the dicumyl peroxide, the reaction is pressurised with 5 bar nitrogen pressure and then depressurised. This procedure is repeated 3 times. The advantage of this procedure is that when the reaction is being implemented, maximum pressures of only 5 bar occur. However, the three-fold pressurisation and depressurisation with nitrogen is extremely troublesome and therefore costly.

The object was therefore to simplify the procedure in such a manner that, on one hand, the pressures arising in the reaction remain as low as possible, so that autoclaves certified for <6 bar can be used, and on the other hand, so that the troublesome handling of nitrogen can be avoided.

The object is resolved by implementing the conversion of the rubber latices with organic peroxides without inertisation. Under these conditions, at 150° C., maximum pressures of 5 bar occur. The rubber gels obtained with this procedure do not differ from rubber gels produced in accordance with the prior art, either with reference to their analytical data or with reference to their functional capability in rubber vulcanisates made from them.

The object of the present invention is therefore a process for production of cross-linked rubber particles by conversion of rubber latices with cross-linking agents, characterised in that the reaction mix is not inertised before the implementation of the cross-linking reaction.

As mentioned above, it is important for the process according to the invention that no measures for inertisation are carried out before the cross-linking reaction with the rubber latex to be treated with cross-linking agents. This means that the atmospheric oxygen is not removed by known measures for inertisation, such as rinsing and operating under nitrogen.

The cross-linking of rubber latices in accordance with the process of the invention in the presence of organic peroxides is otherwise implemented under the known and conventional conditions (U.S. Pat. No. 5,395,891; EP-A 0 854 170).

For the cross-linking of the rubbers, the normal cross-linking agents are used, such as organic peroxides, e.g. dicumyl peroxide, t-butylcumylperoxide, bis-t(butyl-peroxy-isopropyl)benzol, di-t-butyl peroxide, 2,5-dimethyl hexane-2,5-dihydro-peroxide, 2,5-dimethyl hexine-3,2,5-dihydroperoxide, dibenzoyl peroxide, bis-(2,4-dichloro-benzoyl) peroxide and/or t-butyl perbenzoate, and organic azo compounds, such as azo-bis-isobutyronitrile and/or azo-bis-cyclo hexane nitrile. The use of dicumyl peroxide is preferred.

The optimum temperature for implementation of the cross-linking is naturally dependent on the reactivity of the cross-linking agent, and this can be carried out at temperatures from room temperature (approx. 20° C.) to approx. 180° C., optionally under increased pressure (1 to 5 bar), (in this context see Houben-Weyl, Methoden der organischen Chemie, $4^{th}$ edition, Volume 14/2, page 848).

The process in accordance with the invention is suitable for the cross-linking of aqueous rubber dispersions and also for rubber latices produced by emulsion polymerisation, for rubber dispersions obtained through re-dispersion of so-called solvent rubbers and for naturally occurring latices such as natural latex.

The particle diameters of the polymerisates used for cross-linking are within the range 5 to 10,000 nm. A range from 20 to 600 nm is preferred (DVN value in accordance with DIN 53 206).

The conversion of the cross-linking agents with the rubber latex and/or the rubber dispersion is recognisable in that the polymer density, the gel content and the glass transition temperature increase proportionally with the degree of cross-linking. By contrast, the swelling index declines as the cross-linking increases.

The glass transition temperatures of the rubbers used and cross-linked are measured by means of DSC (Differential Scanning Calorimetry) (e.g. Kalorimeter Pyris DSC-7 manufactured by Perkin-Elmer). For measuring the glass transition temperatures, 11.6±0.3 mg substance are used in normal capsules. Two heating phases in each case from −100° C. to +150° C. at a heating rate of 20K/min and one cooling phase of 320K/min with nitrogen rinsing are implemented. The glass transition temperatures are measured during the second DSC heating phase. The glass transition temperatures are increased by cross-linking. The normal increase in glass transition temperature is by 5 to 50° C.

The gel content and swelling index of the rubber gels obtained are determined with reference to a precipitated and dried polymer sample by swelling 250 mg of gel in 25 ml of a suitable solvent, e.g. toluene, for 24 hours while shaking. The gel is centrifuged off at 20,000 rpm, and the wet weight is determined; it is then dried at 70° C. until a constant weight is achieved and weighed again. The gel content is calculated from the quantity of dried polymer relative to the polymer used and shown as a percentage by weight. The gel contents of the cross-linked rubber particles normally provide values >50 wt. %.

The swelling index [Swi] is calculated from the weight of the solvent-containing gel (after centrifugation at 20,000 rpm) and the weight of the dried gel as follows:

$$Swi = \frac{\text{Weight of the wet gel}}{\text{Dry weight of the gel}}$$

The swelling indices of the cross-linked polymers (Swi) in toluene are 1 to 50, preferably 1 to 25.

If the latex is adequately stabilised during the cross-linking, e.g. with emulsifiers, the distribution of particle sizes hardly changes during the conversion. If the latex is not adequately stabilised, deposits may be baked onto the reactor wall during the conversion, stippling may occur or the entire reaction mix may even coagulate. One reason for latex instabilities during the reaction is, for example, that the pH declines during the reaction and as a result, emulsifiers based on carboxylic acid are rendered ineffective. In such cases, it may be helpful, for instance, to create an alkali reserve by adding an adequate quantity of alkali, or to keep the latex pH constant during the reaction by pumping in additional alkali. Another possibility for stabilising the latex is to add suitable emulsifiers either before or during the implementation of the reaction.

In accordance with the inventive process, rubber particles based on polybutadiene (BR), styrene-butadiene-copolymerisates (SBR), natural rubber (NR), nitrile rubber (NBR), polyisoprene (IR) and polychloroprene (CR) can be produced.

The cross-linked rubber particles produced according to the invention are stabilised in the normal manner, coagulated and dried. During isolation from the aqueous dispersion, they are either isolated in a pure form or after addition of an un-cross-linked rubber latex as a master batch. The production of master batches with natural rubber, with styrene/butadiene rubber, with nitrile rubber and with polychloroprene is conventional.

For use as polymeric fillers in rubbers and thermoplasts, the cross-linked rubber particles are compounded and vulcanised with the conventional mixing components.

The cross-linked rubber particles produced in accordance with the invention on the basis of the rubbers named can be used for the production of rubber vulcanisates, which can again be used for the production of an extremely diverse range of formed rubber bodies.

EXAMPLES

A polybutadiene latex as described in U.S. Pat. No. 5,395,891 is used as a starting product. Characteristic data for this latex are shown in Table 1 in the row marked "Starting BR". Before the conversion, the solid concentration of the starting BR is adjusted with de-ionised water to 30 wt. %, and aliquoted for the implementation of the following 4 cross-linking processes with dicumyl peroxide. The conversion with dicumyl peroxide (in each case 1 p.h.r, relative to polybutadiene solids) is carried out in the example in accordance with the invention without nitrogen inertisation. The reference examples 1 and 2 are implemented in accordance with EP-A 854 170 A1, Example 1 (three-fold nitrogen pressurisation and depressurisation cycles). Reference example 3 is carried out in accordance with U.S. Pat. No. 5,395,891, BR gel A1. Characteristic reaction conditions and data on the rubber particles are summarised in the following table:

| Product | DCP (phr) | Reaction type | Max pressure (bar) | Latex pH | Diameter d10 (nm) | d50 (nm) | d80 (nm) | Density (g/cm$^3$) | Gel content (%) | Swi | Tg (° C.) |
|---|---|---|---|---|---|---|---|---|---|---|---|
| Starting BR | 0 | | | | 101 | 118 | 126 | 0.9019 | 90.9 | 13.7 | −85 |
| Product A* | 1.0 | Without inertisation | 5 | 10.8 | 106 | 126 | 139 | 0.9332 | 95.2 | 7.3 | −72 |
| Product B1 | 1.0 | With nitrogen rinsing EP 854170 | 5 | 10.8 | 96 | 112 | 128 | 0.9205 | 95.9 | 7.3 | −76 |
| Product B2 | 1.0 | With nitrogen rinsing EP 854170 | 5 | 10.8 | 108 | 126 | 137 | 0.9365 | 95.2 | 8.2 | −69 |
| Product B3 | 1.0 | With nitrogen US 5395891 | 15.0 | 10.8 | 98 | 115 | 124 | 0.9365 | 94.8 | 8.1 | −69 |

*production process in accordance with invention: without removal of atmospheric oxygen before the cross-linking reaction.

The results show that the analytical data for the cross-linked rubber latex in accordance with the invention and the "dry" rubber gel isolated from it do not differ from the products produced in accordance with the prior art.

Compound Production, Vulcanisation and Results

On the basis of the BR gels described above, rubber compounds are produced and vulcanised. The properties of the corresponding vulcanisates are measured: This series of experiments shows that the rubber gels produced in accordance with the invention do not differ significantly from rubber gels produced in accordance with the prior art, either with reference to mixing or vulcanisation properties.

Using a laboratory kneader, various compounds (data in p.h.r) are prepared in accordance with the following recipe on the basis of different BR gels. The components of the mix are mixed in the sequence indicated in the Table:

| Mix number: | 1* | 2 | 3 | 4 |
|---|---|---|---|---|
| Natural rubber, pre-masticated [1] | 60 | 60 | 60 | 60 |
| Product A | 60 | | | |
| Product B1 | | 60 | | |
| Product B2 | | | 60 | |
| Product B3 | | | | 60 |
| Buna CB 65 [2] | 40 | 40 | 40 | 40 |
| Carbon black N 330 | 2 | 2 | 2 | 2 |
| Active silicic acid [3] | 20 | 20 | 20 | 20 |
| Bis(tri-ethoxy-silyl-propyl-disulfane) [4] | 5 | 5 | 5 | 5 |
| Koresin [5] | 4 | 4 | 4 | 4 |
| Renopol L [6] | 5 | 5 | 5 | 5 |
| Zinc oxide | 5 | 5 | 5 | 5 |
| Stearic acid | 2 | 2 | 2 | 2 |
| TMQ [7] | 1.5 | 1.5 | 1.5 | 1.5 |
| 6PPD [8] | 2.5 | 2.5 | 2.5 | 2.5 |
| Sulfur | 5 | 5 | 5 | 5 |
| CBS [9] | 2 | 2 | 2 | 2 |
| KA 9188 [10] | 3 | 3 | 3 | 3 |

*Compound with BR gel produced in accordance with the invention
[1] SMR 5 (Standard Malaysian Rubber)
[2] Stellate branched polybutadiene rubber from Bayer AG
[3] Vulkasil ® S from Bayer AG
[4] Si 69 ® (Degussa AG)
[5] Condensation product from t-butyl phenol and acetylene
[6] Softeners based on mineral oil
[7] 2,2,4-trimethyl-1,2-dihydroquinolone (Vulkanox ® HS from Bayer AG)
[8] N-1,3-dimethyl butyl-N'-phenyl-p-phenylene diamine (Vulkanox ® 4020 NA from Bayer AG)
[9] N-cyclohexyl-2-benzothiazylsulfenamide (Vulkacit ® CZ from Bayer AG)
[10] Experimental product KA 9188 from Bayer AG (Vulcuren ®)

The following parameters are used to characterise the properties of the un-cross-linked compound: Mooney viscosity ML 1+4 (100° C.); Mooney relaxation MR 30 and Mooney scorch (MS) at 130° C.

| Mix number: | 1* | 2 | 3 | 4 |
|---|---|---|---|---|
| ML 1 + 4 (100° C.) [ME] | 49.8 | 49.9 | 51.0 | 51.5 |
| MR 30 [%] | 8.5 | 8.7 | 8.6 | 8.6 |
| MS (130° C.) | 21.5 | 22.8 | 22.5 | 22.6 |

On the basis of the above-named compounds, the following test results are obtained after 15 minutes vulcanisation time at 165° C.:

| Mix number: | 1* | 2 | 3 | 4 |
|---|---|---|---|---|
| Tensile strength [Mpa] | 2.2 | 2.0 | 2.5 | 2.4 |
| Elongation at break [%] | 61 | 68 | 58 | 56 |
| Tensile stress/50% [MPa] | 2.0 | 2.0 | 2.1 | 2.1 |
| Shore hardness A, 23° C. | 68 | 66 | 69 | 70 |
| Shore hardness A, 70° C. | 69 | 67 | 70 | 69 |
| Rebound resilience, 23° C. [%] | 75 | 78 | 73 | 72 |
| Rebound resilience, 70° C. [%] | 82 | 84 | 80 | 81 |
| Goodrich Flexometer Δ T [° C.] | 1.8 | 1.0 | 2.1 | 2.3 |
| Goodrich Flexometer T [° C.] | 103.3 | 101.5 | 104.0 | 103.8 |
| tan δ (60° C.) | 0.012 | 0.010 | 0.013 | 0.014 |

What is claimed is:

1. Process for producing cross-linked rubber particles comprising BR, SBR, NBR, IR, CR or mixtures thereof, comprising the step of converting rubber latices with cross-linking agents, wherein during conversion atmospheric oxygen is not removed by nitrogen inertization.

2. Process in accordance with claim 1, wherein said cross-linking agents are organic peroxides.

3. Process in accordance with claim 2, wherein said cross-linking agent is dicumyl peroxide.

4. Rubber vulcanizates comprising cross-linked rubber particles comprising BR, SBR, NBR, IR, CR or mixtures thereof produced by a process comprising the step of converting rubber latices with cross-linking agents, wherein during conversion atmospheric oxygen is not removed by nitrogen inertization.

* * * * *